United States Patent
Song

(10) Patent No.: US 8,473,831 B2
(45) Date of Patent: Jun. 25, 2013

(54) SEMICONDUCTOR MEMORY APPARATUS AND DATA READ METHOD OF THE SAME

(75) Inventor: Choung Ki Song, Ichon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 669 days.

(21) Appl. No.: 12/650,986

(22) Filed: Dec. 31, 2009

(65) Prior Publication Data

US 2011/0041035 A1    Feb. 17, 2011

(30) Foreign Application Priority Data

Aug. 11, 2009   (KR) .................. 10-2009-0073691

(51) Int. Cl.
*H03M 13/00*    (2006.01)

(52) U.S. Cl.
USPC ........................................ 714/799

(58) Field of Classification Search
None
See application file for complete search history.

(56) References Cited

U.S. PATENT DOCUMENTS

| | | | |
|---|---|---|---|
| 6,742,146 B2* | 5/2004 | Gross et al. | 714/702 |
| 7,114,117 B2* | 9/2006 | Tamura et al. | 714/763 |
| 7,415,581 B2 | 8/2008 | Wallner et al. | |
| 7,428,689 B2 | 9/2008 | Wallner et al. | |
| 7,522,440 B2 | 4/2009 | Park et al. | |
| 2008/0082900 A1* | 4/2008 | Yoon | 714/768 |
| 2009/0183051 A1 | 7/2009 | Balb | |
| 2009/0251988 A1 | 10/2009 | Kim et al. | |

FOREIGN PATENT DOCUMENTS

| | | |
|---|---|---|
| JP | 2001-084791 | 3/2001 |
| KR | 10-1999-0060758 A | 7/1999 |
| KR | 10-2008-0024413 A | 3/2008 |

* cited by examiner

*Primary Examiner* — Michael Maskulinski
(74) *Attorney, Agent, or Firm* — William Park & Associates Patent Ltd.

(57) ABSTRACT

Various embodiments of a semiconductor memory apparatus and a related data read method are disclosed. According to one exemplary embodiment, a semiconductor memory apparatus may include a global data bus, an error detection unit, a first data output unit, and a second data output unit. The global data bus transfers first data and second data. The error detection unit performs an error bit detection operation on the first data and the second data and generates a first error detection bit and a second error detection bit. The first data output unit combines the first data and the first error detection bit in series and outputs the combined bits. The second data output unit combines the second data and the second error detection bit in series and outputs the combined bits.

11 Claims, 4 Drawing Sheets

SEMICONDUCTOR MEMORY APPARATUS AND DATA READ METHOD OF THE SAME

CROSS-REFERENCE TO RELATED APPLICATION

The present application claims priority under 35 U.S.C 119(a) to Korean Application No 10-2009-0073691, filed on Aug. 11, 2009, in the Korean Intellectual Property Office, which is incorporated herein by reference in its entirety as set forth in full.

BACKGROUND OF THE INVENTION

1. Technical Field

Embodiments relate to a semiconductor memory apparatus, and more particularly, to a data read circuit of the semiconductor memory apparatus.

2. Related Art

In general, a semiconductor memory apparatus transfers/receives multi-bit data to/from an external memory control device in a serial manner. On the other hand, the semiconductor memory apparatus internally includes a plurality of global data buses GIO in order to transfer/receive the multi-bit data to/from a core region, and the multi-bit data transferred via the global data buses are configured in a parallel manner. Therefore, since the multi-bit data are transferred in the parallel manner inside the semiconductor memory apparatus and are transferred in the serial manner outside the semiconductor memory apparatus, a data read circuit of the semiconductor memory apparatus performs an operation for aligning the parallel data transferred from the core circuit region via the global data bus in series. Afterwards, the data read circuit performs an operation for driving the data aligned in series to output the driven data through a pad.

In general, a semiconductor memory apparatus includes a circuit configuration to detect an error of input data, and discriminates whether an error bit is included in the data or not by using a technique such as a Cyclic Redundancy Check (CRC) technique. On the other hand, the data bits outputted through the pad via the global data buses do not include such an error detection information. That is, a conventional semiconductor memory apparatus may not include a configuration to output the error detection information together with output data, and thus is lacking in reliability of the data, thereby having a difficulty in realizing a high-speed semiconductor memory apparatus.

SUMMARY OF THE INVENTION

The embodiments of the present invention include a semiconductor memory apparatus and a data read method of the same, capable of improving reliability of read data.

In one embodiment of the present invention, a semiconductor memory apparatus comprises: a global data bus configured to transfer first data and second data; an error detection unit configured to perform an error bit detection operation on the first data and the second data and generate a first error detection bit and a second error detection bit; a first data output unit configured to combine the first data and the first error detection bit in series and drive and output the combined bits; and a second data output unit configured to combine the second data and the second error detection bit in series and drive and output the combined bits.

In another embodiment of the present invention, a semiconductor memory apparatus comprises: a global data bus configured to transfer multi-bit data; an error detection unit configured to perform an error bit detection operation on the multi-bit data to generate a plurality of error detection bits; and a data output unit configured to combine a data bit in the multi-bit data and a corresponding error detection bit in the plurality of error detection bits in series and drive and output the combined bits.

In still another embodiment of the present invention, a data read method of a semiconductor memory apparatus includes: latching each bit of data outputted via a global data bus, in response to a latch control signal; performing an error detection operation on the latched bits to generate an error detection bit; and combining the data bits and the error detection bit in series and driving the combined bits to output the driven data through a data pad.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

DETAILED DESCRIPTION OF THE EMBODIMENTS

Figure 1:
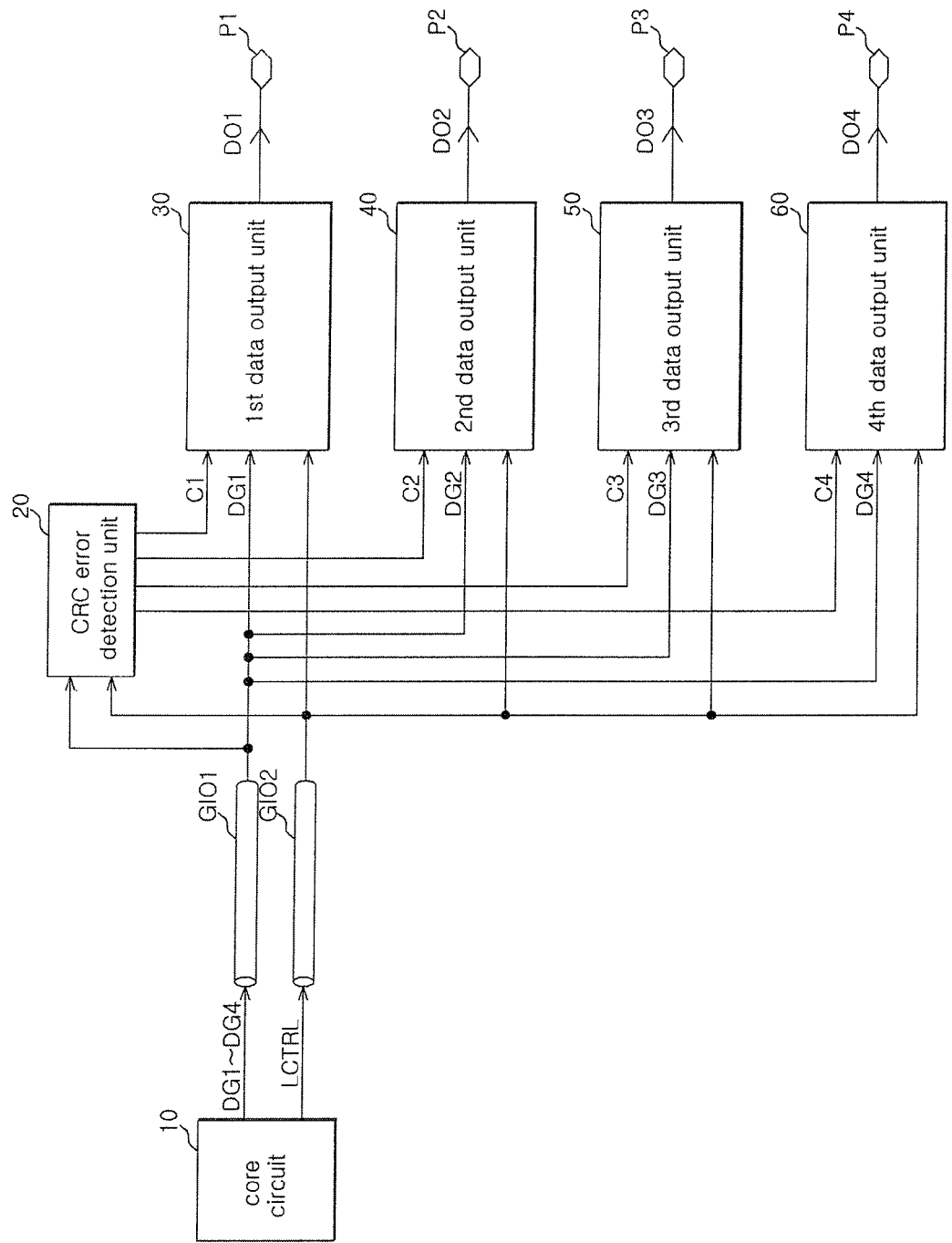
FIG. 1 is a block diagram schematically showing a configuration of a semiconductor memory apparatus according to one exemplary embodiment.

Reference will now be made in detail to the exemplary embodiments consistent with the present disclosure, examples of which are illustrated in the accompanying drawings. Wherever possible, the same reference characters will be used throughout the drawings to refer to the same or like parts.

FIG. 1 is a block diagram schematically showing a configuration of a semiconductor memory apparatus according to one exemplary embodiment. In this embodiment, by way of example only, a total of 16-bit data are transferred via global data buses GIO. Therefore, first to fourth global data DG1 to DG4 include 4 data bits, respectively.

As shown in FIG. 1, the semiconductor memory apparatus according to the embodiment includes a first global data bus GIO1 configured to transfer the first to fourth global data DG1 to DG4 outputted from a core circuit 10; a second global data bus GIO2 configured to transfer a latch control signal LCTRL outputted from the core circuit 10; a CRC (Cyclic Redundancy Check) error detection unit 20 configured to perform an error detection operation on the first to fourth global data DG1 to DG4 in response to the latch control signal LCTRL to generate first to fourth CRC bits C1 to C4'; a first data output unit 30 configured to combine the first global data DG1 and the first CRC bit C1 in series in response to the latch control signal LCTRL and drive the combined bits to output first output data DO1; a second data output unit 40 configured to combine the second global data DG2 and the second CRC bit C2 in series in response to the latch control signal LCTRL and drive the combined bits to output second output data DO2; a third data output unit 50 configured to combine the third global data DG3 and the third CRC bit C3 in series in response to the latch control signal LCTRL and drive the combined bits to output third output data DO3; and a fourth data output unit 60 configured to combine the fourth global data DG4 and the fourth CRC bit C4 in series in response to the latch control signal LCTRL and drive the combined bits to output fourth output data DO4.

Although the CRC error detection unit 20 is used as an error detection unit herein, the CRC error detection unit 20 is by way of example only. Other error detection unit that employs other error detection technique than the CRC technique can be used. The CRC error detection unit 20 receives the first to fourth global data DG1 to DG4 transferred via the first global data bus GIO1. Then, the CRC error detection unit 20 performs the CRC error detection operation on the total of 16-bit data inputted and generates the first to fourth CRC bits C1 to C4 as an error detection result on respective 4-bit data among the 16-bit data, respectively.

The latch control signal LCTRL is implemented as a pulse-shaped signal and is generated in response to a command on a column operation during a data output operation in the core circuit 10.

In response to the latch control signal LCTRL, the first to fourth data output units 30 to 60 align in series the respective 4 bits of the first to fourth global data DG1 to DG4, respectively, that have been transferred in parallel and drive the aligned bits to generate the first to fourth output data DO1 to DO4, respectively. At this time, the first to fourth data output units 30 to 60 align the first to fourth global data DG1 to DG4 together with the first to fourth CRC bits C1 to C4 to output the first to fourth output data DO1 to DO4, respectively.

Accordingly, the first to fourth output data DO1 to DO4 include the first to fourth CRC bits C1 to C4, respectively, and are outputted through first to fourth data pads P1 to P4 as 5-bit serial data, respectively. In which bit of the 5-bits data in the first to fourth output data DO1 to DO4 can the first to fourth CRC bits C1 to C4, respectively, be included is determined based on a predetermined transfer protocol between the semiconductor memory apparatus and an external memory control device.

Although the present embodiment was explained with only 4 data output units 30 to 60, it should be understood that the semiconductor memory apparatus consistent with the present disclosure may include more data output units. In addition, the respective global data can include more data bits. That is, the semiconductor memory apparatus according to the present disclosure can be configured such that more data bits are transferred via the first global data bus GIO1, more data output units are included, and the respective data output units output more data bits.

Figure 2:
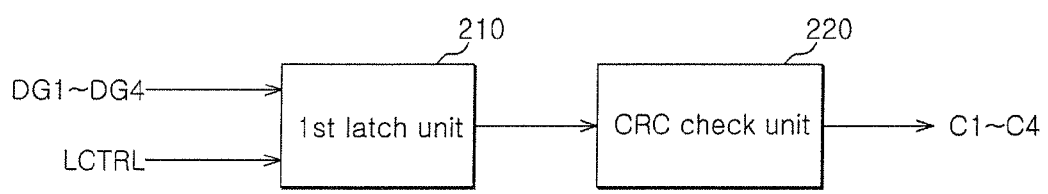
FIG. 2 is a diagram showing a configuration of an embodiment of a CRC error detection unit of FIG. 1.

FIG. 2 is a diagram showing a configuration of an exemplary embodiment of the CRC error detection unit 20 of FIG. 1. As shown in FIG. 2, the CRC error detection unit 20 includes a first latch unit 210 configured to latch the first to fourth global data DG1 to DG4 in response to the latch control signal LCTRL and a CRC check unit 220 configured to perform a CRC check operation on data bits transferred from the first latch unit 210 to generate the first to fourth CRC bits C1 to C4.

In such a configuration, the first latch unit 210 of the CRC error detection unit 20 latches all of the 16 bits included in the first to fourth global data DG1 to DG4 at a timing when the latch control signal LCTRL is enabled. Then, the CRC check unit 220 performs the CRC error check operation on the 16 bits latched in the first latch unit 210. The CRC check unit 220 includes a plurality of exclusive OR gates, and performs a logic exclusive OR operation on the 16 bits latched in the first latch unit 210 based on the predetermined protocol. Thus, the CRC check unit 220 generates the first to fourth CRC bits C1 to C4. Afterwards, in the external memory control device, the first to fourth CRC bits C1 to C4 are decoded based on the predetermined protocol and are used to discriminate whether there is an error bit or not.

Figure 3:
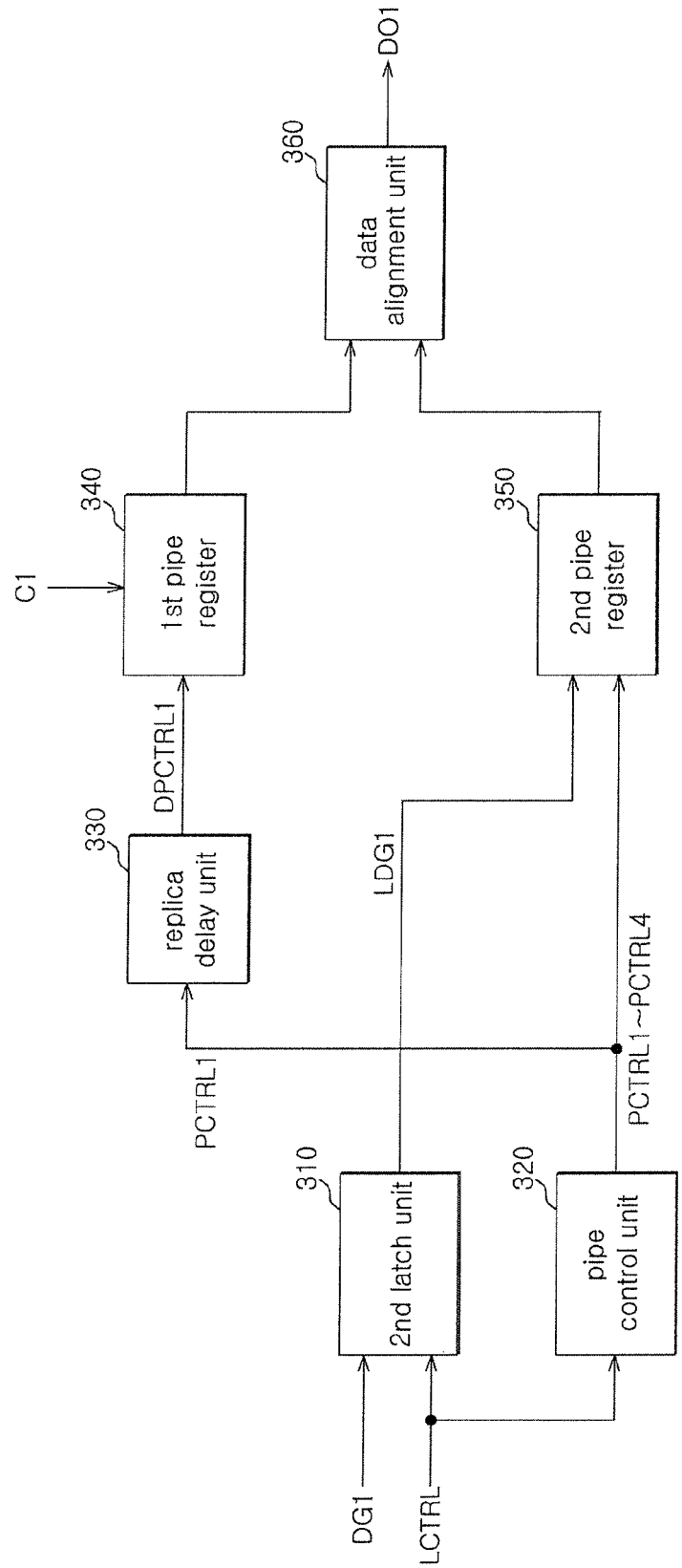
FIG. 3 is a diagram showing a configuration of an embodiment of a first data output unit of FIG. 1.

FIG. 3 is a diagram showing a configuration of an exemplary embodiment of the first data output unit 30 of FIG. 1. Since all of the first to fourth data output units 30 to 60 have substantially the same configuration, the first data output unit 30 is shown as a representative example, so that a description on the other data output units 40 to 60 will be substituted with the description of the first data output unit 30.

As shown in FIG. 3, the first data output unit 30 may include: a second latch unit 310 configured to latch the first global data DG1 in response to the latch control signal LCTRL; a pipe control unit 320 configured to divide a phase of the latch control signal LCTRL to generate first to fourth pipe control signals PCTRL1 to PCTRL4; a replica delay unit 330 configured to delay the first pipe control signal PCTRL1 by as much as a predetermined time; a first pipe register 340 configured to latch the first CRC bit C1 in response to a first delayed pipe control signal DPCTRL1 transferred from the replica delay unit 330; a second pipe register 350 configured to sequentially latch each bit of first latched global data LDG1 transferred from the second latch unit 310, in response to the first to fourth pipe control signals PCTRL1 to PCTRL4; and a data alignment unit 360 configured to align signals transferred from the first pipe register 340 and the second pipe register 350 in series and drive the aligned signals to generate the first output data DO1.

The second latch unit 310 latches each of 4 data bits included in the first global data DG1 in response to the latch control signal LCTRL. The pipe control unit 320 is implemented by combining a delay unit and a pointer circuit and divides the phase of the latch control signal LCTRL by 4 to generate the first to fourth pipe control signals PCTRL1 to PCTRL4, which are sequentially enabled as a pulse-shaped signal.

The replica delay unit 330 is included to delay an enable timing of the first pipe register 340, so that the first pipe control signal PCTRL1 is not inputted to the first pipe register 340 while the CRC error detection unit 20 operates, i.e., before the first CRC bit C1 is generated. For this purpose, it is required that an appropriate delay time to support the operation of the first pipe register 340 be predetermined in the replica delay unit 330. Afterwards, the first pipe register 340 latches the first CRC bit C1 in response to the first delayed pipe control signal DPCTRL1 transferred from the replica delay unit 330.

Although the replica delay unit 330 in the first data output unit 30 is configured to receive the first pipe control signal PCTRL1, the replica delay units in the other data output units 40 to 60 can be configured to receive one of the other pipe control signals PCTRL2 to PCTRL4.

The second pipe register 350 latches 4 data bits transferred from the second latch unit 310 in response to the first to fourth pipe control signals PCTRL1 to PCTRL4, which are sequentially enabled, respectively. The data alignment unit 360 combines the first CRC bit C1 and 4 data bits transferred from the second pipe register 350 in series, and drives the combined bits to output the driven data as the first output data DO1. Here, a sequence to combine the first CRC bit C1 and the 4 data bits in series is determined based on the predetermined transfer protocol.

Figure 4:
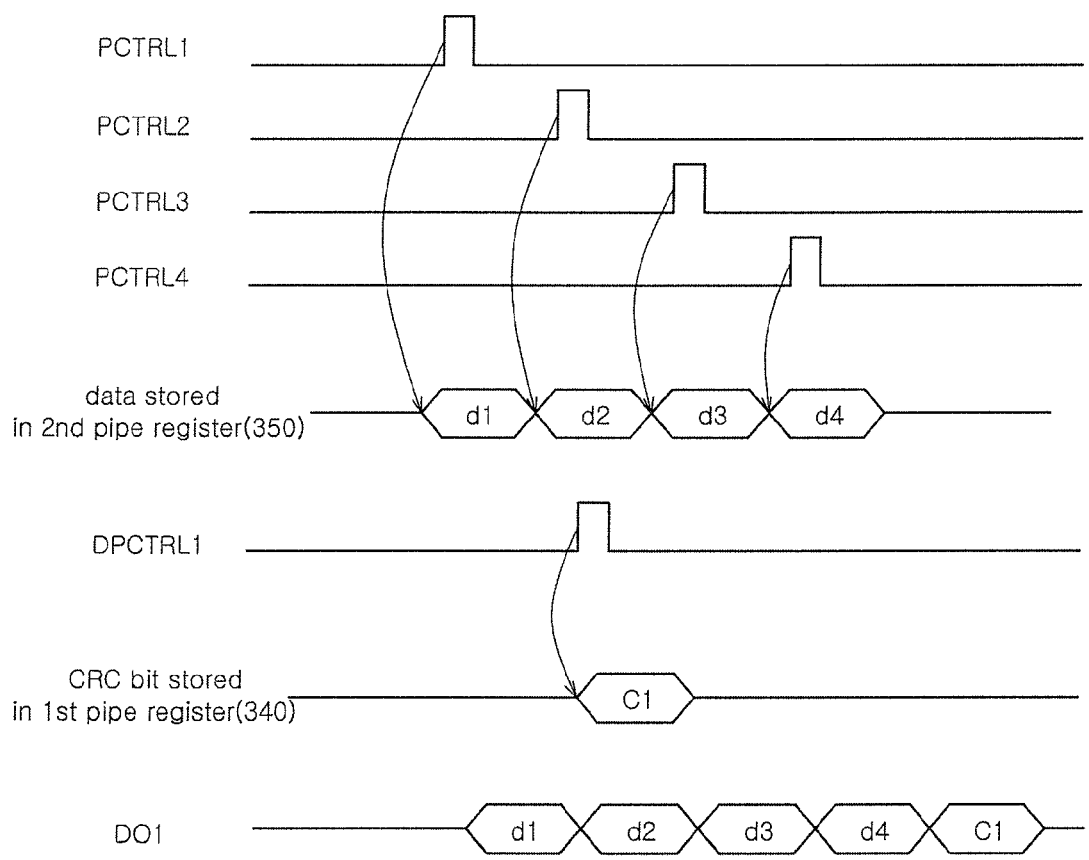
FIG. 4 is a timing diagram showing an operation of the first data output unit of FIG. 3.

An operation of the first data output unit 30 will be readily understood with reference to FIG. 4. FIG. 4 is a timing diagram showing the operation of the first data output unit 30 of FIG. 3.

In FIG. 4, waveforms of the first to fourth pipe control signals PCTRL1 to PCTRL4, which are generated by dividing the phase of the latch control signal LCTRL, are shown. Referring to FIG. 4, it will be readily understood that the second pipe register 350 stores data bits d1 to d4 in response to the first to fourth pipe control signals PCTRL1 to PCTRL4, respectively. In addition, it will be also readily understood that the first delayed pipe control signal DPCTRL1 is generated by delaying the first pipe control signal PCTRL1 and the first pipe register 340 stores the first CRC bit C1 in response to the first delayed pipe control signal DPCTRL1.

The CRC bit C1 and the data bits d1 to d4 stored in the first pipe register 340 and the second pipe register 350, respectively, are aligned in the data alignment unit 360 based on the predetermined protocol and are outputted as the first output data D01. Although the first CRC bit C1 is aligned next to the data bits d1 to d4 in this embodiment, the location of the first CRC bit C1 can be changed, for example, based on the transfer protocol with the external memory control device, as mentioned above.

Thus, the first output data DO1 outputted from the first data output unit 30 can includes the first CRC bit C1, so that the external memory control device can receive the first output data DO1 through the first data pad P1 and discriminate whether the data includes the error bit or not.

In accordance with the present disclosure, the semiconductor memory apparatus may perform the error detection operation on multi-bit data outputted via the global data bus to generate a plurality of error detection bits, align the data together with the plurality of error detection bits in series, respectively, and output the aligned bits through respective data pads. Therefore, the external memory control device can receive the data, including the error detection bits, and accordingly discriminate whether the output data of the semiconductor memory apparatus includes the error bit or not, thereby improving the reliability of data read operation of the semiconductor memory apparatus.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A semiconductor memory apparatus comprising:
   a global data bus configured to transfer first data and second data;
   an error detection unit configured to perform an error bit detection operation on the first data and the second data and generate a first error detection bit and a second error detection bit;
   a first data output unit configured to output combined first bits generated by combining the first data and the first error detection bit in series to a first data pad; and
   a second data output unit configured to output combined second bits generated by combining the second data and the second error detection bit in series to a second data pad.

2. The semiconductor memory apparatus of claim 1, wherein the first data and the second data comprise a plurality of data bits,
   wherein the error detection unit is configured to generate the first error detection bit as a result of the error detection operation on a first part of data bits among the plurality of data bits in the first data and the second data, and
   wherein the error detection unit is configured to generate the second error detection bit as a result of the error detection operation on a second part of data bits among the plurality of data bits in the first data and the second data.

3. The semiconductor memory apparatus of claim 1, wherein the error detection unit comprises:
   a latch unit configured to latch the first data and the second data in response to a latch control signal transferred from a core circuit; and
   an error check unit configured to perform an error check operation on data bits transferred from the latch unit and generate the first error detection bit and the second error detection bit.

4. The semiconductor memory apparatus of claim 1, wherein the first data output unit comprises:
   a latch unit configured to latch the first data in response to a latch control signal transferred from a core circuit;
   a pipe control unit configured to divide a phase of the latch control signal and generate a plurality of pipe control signals which are sequentially enabled;
   a replica delay unit configured to delay one of the plurality of pipe control signals by as much as a predetermined time; a first pipe register configured to latch the first error detection bit in response to an output signal of the replica delay unit;
   a second pipe register configured to sequentially latch each bit of data transferred from the latch unit in response to the plurality of pipe control signals; and
   a data alignment unit configured to align signals transferred from the first pipe register and the second pipe register in series and output the aligned signals.

5. The semiconductor memory apparatus of claim 1, wherein the second data output unit comprises:
   a latch unit configured to latch the second data in response to a latch control signal transferred from a core circuit;
   a pipe control unit configured to divide a phase of the latch control signal and generate a plurality of pipe control signals which are sequentially enabled;
   a replica delay unit configured to delay one of the plurality of pipe control signals by as much as a predetermined time;
   a first pipe register configured to latch the second error detection bit in response to an output signal of the replica delay unit;
   a second pipe register configured to sequentially latch each bit of data transferred from the latch unit, in response to the plurality of pipe control signals; and
   a data alignment unit configured to align signals transferred from the first pipe register and the second pipe register in series and output the aligned signals.

6. A semiconductor memory apparatus comprising:
a global data bus configured to transfer multi-bit data;
an error detection unit configured to perform an error bit detection operation on the multi-bit data to generate a plurality of error detection bits; and
a data output unit configured to output combined bits generated by combining a data bit in the multi-bit data and a corresponding error detection bit in the plurality of error detection bits in series to a data pad,
wherein the data output unit comprises:
a latch unit configured to latch the data bit in the multi-bit data in response to a latch control signal transferred from a core circuit;
a pipe control unit configured to divide a phase of the latch control signal and generate a plurality of pipe control signals which are sequentially enabled;
a replica delay unit configured to delay one of the plurality of pipe control signals by as much as a predetermined time;
a first pipe register configured to latch the corresponding error detection bit among the plurality of error detection bits in response to an output signal of the replica delay unit;
a second pipe register configured to sequentially latch each bit of data transferred from the latch unit, in response to the plurality of pipe control signals; and
a data alignment unit configured to align signals transferred from the first pipe register and the second pipe register in series and output the aligned signals.

7. The semiconductor memory apparatus of claim 6, wherein the error detection unit comprises:
a latch unit configured to latch the multi-bit data in response to a latch control signal transferred from a core circuit; and
an error check unit configured to perform an error check operation on data bits transferred from the latch unit and generate the plurality of error detection bits.

8. A data read method of a semiconductor memory apparatus, comprising:
latching each bit of data outputted via a global data bus in response to a latch control signal;
performing an error detection operation on the latched bits to generate an error detection bit; and
combining the data bits and the error detection bit in series and outputting the combined bits through a data pad.

9. The data read method of claim 8, wherein the latch control signal comprises a pulse signal generated in response to a command on a column operation during a data output operation in a core circuit.

10. The data read method of claim 8, wherein combining comprises:
latching the data bits in response to the latch control signal;
dividing a phase of the latch control signal to generate a plurality of pipe control signals which are sequentially enabled;
delaying one of the plurality of pipe control signals by as much as a predetermined time;
latching the error detection bit in response to the delayed pipe control signal;
sequentially latching the latched data bits in response to the plurality of pipe control signals; and
aligning the latched error detection bit and the latched data bits in series and outputting the aligned bits.

11. The data read method of claim 8, wherein combining comprises:
latching the data bits in response to the latch control signal;
dividing a phase of the latch control signal to generate a plurality of pipe control signals which are sequentially enabled;
delaying one of the plurality of pipe control signals by as much as a predetermined time;
latching the error detection bit in response to the delayed pipe control signal;
sequentially latching the latched data bits in response to the plurality of pipe control signals; and
aligning the latched error detection bit and the latched data bits in series and outputting the aligned bits.

* * * * *